Feb. 19, 1935.                H. L. SAXTON              1,992,044
                         STATIC REDUCING SYSTEM
                         Filed March 29, 1932
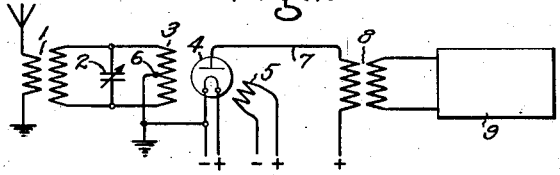
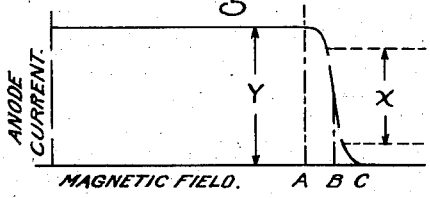
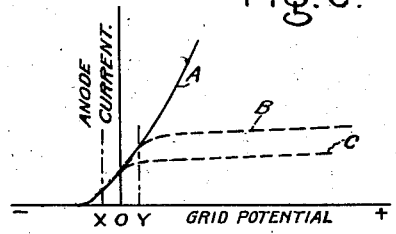
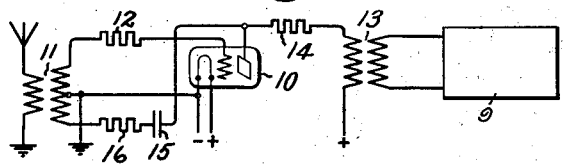
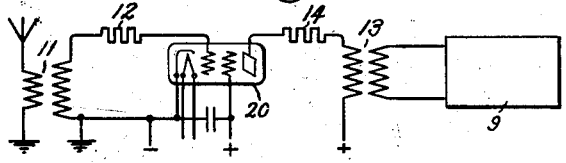
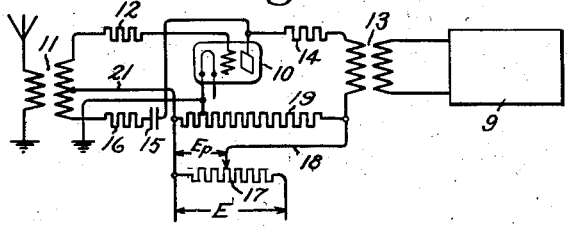
Inventor:
Harold L. Saxton,
by Charles E. Tullar
    His Attorney.

Patented Feb. 19, 1935

1,992,044

UNITED STATES PATENT OFFICE 1,992,044

STATIC REDUCING SYSTEM

Harold L. Saxton, State College, Pa., assignor to General Electric Company, a corporation of New York Application March 29, 1932, Serial No. 601,769

3 Claims. (Cl. 250—20)

My invention relates to means for reducing the effects caused by natural electric phenomena in the ether, commonly known as atmospherics, and stray electromagnetic disturbances due to the influences of certain electrical apparatus such as motors, X-ray apparatus, electric railways and the like. More particularly my invention relates to the type of means customarily known as "static eliminators". It has for one of its objects to provide means whereby the amount of energy due to atmospherics, and stray electromagnetic disturbances which is permitted to enter the circuit of a radio receiver is limited to such an extent that the circuits of the radio receiver may discriminate between the signals and the atmospheric and stray electromagnetic disturbances, thereby eliminating the disturbances from the output of the radio receiver.

Heretofore various systems have been proposed to eliminate static by filtering or balancing out the disturbances before the signal energy is impressed upon the receiver circuit. Such systems have been unsatisfactory because recurrences of the disturbances do not have the same characteristics and hence the filter or balancing system could not perform its function satisfactorily.

A radio receiver is seldom, if ever, in resonance with the atmospheric or stray electromagnetic disturbances, commonly known as static. The energy of such disturbances in the antenna is many times as great as the signal energy and thus the radio receiver responds to the disturbances due to the shock impulse. If the energy of the disturbances is equal to or less than the signal energy, the receiver will readily differentiate between the disturbances and the signal, and reject the disturbances, because the receiver is tuned to the signal frequency and the disturbances do not have sufficient energy to cause the receiver circuits to respond by shock impulse action.

In accordance with my invention, I provide a simple device to be inserted between the antenna and the receiver which will pass the signals up to their full energy level and limit the disturbances substantially to the same energy level.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which Fig. 1 represents one embodiment of my invention; Fig. 2 represents an operating characteristic of the embodiment shown in Fig. 1; Fig. 3 represents a preferred embodiment of my invention; Fig. 4 represents the embodiment shown in Fig. 3 when used with a screen grid tube; Fig. 5 represents a modification of Fig. 3; and Fig. 6 represents the operating characteristics of the forms of the invention shown in Figs. 3, 4 and 5.

Referring to Fig. 1 of the drawing, I have illustrated therein an input transformer 1, of which the primary winding is connected to the antenna and ground. The secondary winding of the input transformer 1 is shunted by a tuning capacitor 2 and the control coil 3 of a magnetically controlled electron discharge device 4. The electron discharge device 4 has an exciting coil 5 which is connected to a suitable source of direct current. To neutralize the capacitance between the control coil 3 and the anode of the electron discharge device 4, a connection 6 is provided from the cathode to an intermediate point on the control coil 3 which is symmetrically arranged with respect to the anode. This neutralization is necessary to prevent a transfer of the energy of the disturbances from the input circuit to the output circuit by means of the capacitance between the control coil 3 and the anode of the device 4. The output circuit 7, which is connected to the anode of electron discharge device 4, is coupled to a shielded receiver 9 by means of transformer 8. Suitable sources of potential are connected to the leads as indicated. The coils and apparatus constituting my invention should be placed in shielded compartments (not shown) to prevent them from picking up the energy of the disturbances.

For an explanation of the operation of Fig. 1, reference may be had to Fig. 2 in which the magnetic field strength is plotted as abscissa and the anode current for a particular anode voltage as ordinate. It will be seen that the anode current remains substantially constant from zero field strength up to a field strength corresponding to the point A. A slight increase in field strength beyond this point results in a marked decrease in anode current, and with a field strength corresponding to point C, complete cut-off is obtained. In operation, the current in the exciting coil 5 is adjusted to give a field strength corresponding to point B. Signal voltage impressed upon the discharge device 4 by the coil 3 varies the anode current between the limits indicated by X. If a voltage due to atmospheric or stray electromagnetic disturbances is impressed upon discharge device 4, the anode current cannot exceed the limits indicated at Y regardless of the intensity of the disturbance. It will be seen that the effect in the output circuit of the electron discharge device 4 resulting from any disturbance will not greatly exceed the effect resulting from signal energy, and it is evident that the receiver will be enabled to discriminate between the signal and disturbances because the disturbances are of a different frequency and are not strong enough to cause the receiver to respond by shock impulse, and thus the disturbances will not appear in the output of the receiver.

In Fig. 3, I have illustrated an embodiment of my invention utilizing a three-element electron discharge device 10, whose control electrode is connected to the secondary winding of transformer 11 through resistor 12. This input circuit to device 10 is shown to be aperiodic so that it will readily pass all of the frequencies used in the band to be received, but may comprise a suitable type of tuned circuit. The output of device 10 is transferred to the receiver by means of transformer 13 which is connected to the anode of the electron discharge device 10 through a resistor 14. To neutralize the inter-electrode capacity, one of the methods known in the art may be used. For this purpose, a capacitor 15 and a resistor 16 may be arranged in series between the anode of device 10 and the one extremity of transformer 11; and the cathode of device 10 is connected to an intermediate point on the secondary of transformer 11. This neutralization prevents the transfer of energy due to disturbances, from the input to the output of the device 10 by means of the inter-electrode capacity. Suitable anode voltage is supplied to the device 10 of such value that the anode current will cut off at a very small negative grid voltage. The entire arrangement may be placed in shielded containers, (not shown) to prevent the energy of the disturbances from being picked up by the component parts.

For an explanation of the operation of the embodiment illustrated in Fig. 3, reference may be had to Fig. 6 which shows the anode current-grid potential characteristic of discharge device 10. The resistor 12 serves to shift and bend the anode current-grid potential curve A shown in Fig. 6 to the position shown by curve B, thereby limiting the length of the sloped portion of the anode-current grid potential characteristic. This bending of the curve is due to the flow of grid current through resistor 12 when the grid swings to a positive potential. The resistor 14 serves to bend the curve still farther to the position shown by curve C, because of the drop in anode potential due to the flow of anode current through the resistor. During normal operation, the signal voltage impressed upon discharge device 10 will cause it to operate on that part of curve B between the limits X and Y. Any increase in the voltage impressed upon device 10, due to atmospheric or stray electro-magnetic disturbances cannot increase the anode current materially because the curve B is nearly flat. It will be apparent that the effect resulting from these disturbances in the output of discharge device 10 will not greatly exceed the effect resulting from the signal energy. The relation between the signal energy and the energy from the disturbances will be of such proportions that the receiver will be enabled to discriminate against the disturbances, because of the difference in frequency and the inability of small energy of the disturbances to cause a shock impulse response in the receiver.

The curve A in Fig. 6 may be caused to bend down by operating the cathode of electron discharge device 10 at a subnormal temperature. This method may be combined with the above method which uses resistors in the circuits. Either method or the combination methods are effective to bend curve A.

Fig. 4 illustrates the use of a screen-grid electron discharge device 20 in a circuit similar to that shown in Fig. 3. The screen-grid device obviates the necessity for neutralizing means.

The arrangements described above are usually designed so that the signals from a strong or local station are not limited. It may be desirable to receive very weak signals from distant stations, and under such conditions the optimum reduction of static cannot be secured with the above arrangements. Accordingly, I have provided means for adjusting the circuit for obtaining the optimum reduction of static when receiving very weak signals. This arrangement is disclosed in Fig. 5 in which is shown a modification of the arrangement shown in Fig. 3, in which similar reference characters are used for similar components. A potentiometer 17 is arranged across the source of potential E, with the adjustable contact connected to the anode of discharge device 10 through conductor 18, transformer 13 and resistance 14. A resistor 19 is connected at one extremity to conductor 18 and at the other extremity to the conductor 21 which is connected to an intermediate point on the secondary of transformer 11. The cathode of device 10 is connected to an intermediate point on the resistor 19 to provide the proper relation between the grid bias and the anode potential. As the anode supply potential Ep is decreased by adjusting the potentiometer 17, the anode potential and the negative grid bias are also decreased which results in curve C having a lower ordinate. It will be seen that the weak signals can be accommodated by proper adjustment of the potentiometer 17 so that the energy of the disturbances transmitted to the receiver will be limited to a degree such that it is not much greater than the energy of the signals. The entire arrangement may be placed in suitable shielded containers (not shown).

My invention in combination with a radio receiver has the advantage of permitting the reception of signals without the annoyance of noise due to atmospheric or stray electromagnetic disturbances, regardless of the intensity of such disturbances. My invention has the further advantages of being simple and inexpensive, and that it may be used in combination with a receiver of any type, without increasing the number of adjustments or tuning controls.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention as set forth in the appended claims.

What I claim as new and desire to secure by Letters Patent of the United States is:

1. In combination, a radio signal receiver, an antenna circuit, and means interposed between said radio receiver and said antenna circuit to transfer energy from said antenna to said receiver, said means including an electron discharge device, an aperiodic input circuit and an output circuit for said electron discharge device, means included in each of said input and output circuits for bending the anode current-grid potential characteristic whereby the energy of static disturbances transferred to the receiver is limited substantially to the signal energy level so that the receiver responds only to said signal energy, a source of potential, and means connected between said source and said circuits for providing the proper proportion between the potential applied to said input circuit and the potential applied to said output circuit irrespective of the voltage of said source of potential.

2. In combination, a radio signal receiver, an antenna circuit, and means coupled to said antenna circuit and said radio receiver for transferring energy from said antenna circuit to said receiver, said means including an electron discharge device, an aperiodic input circuit and an output circuit therefor, each of said circuits including a high resistance for altering the anode current-grid potential characteristic whereby said means so limits the energy of static disturbances that the signal-to-static ratio of the energy transferred to the receiver is substantially unity, a source of potential, means connected between said source and said circuits for providing the proper proportion between the potential applied to said input circuit and the potential applied to said output circuit irrespective of the voltage applied to said means, and means for varying the voltage applied to said latter means whereby the anode current-grid voltage characteristic may be further altered.

3. A static limiting device including an electron discharge device having a cathode, an anode and a control grid, input and output circuits for said electron discharge device, said input and output circuits each having a high resistance to limit the slope portion of the anode current-grid potential characteristic, a resistor connected between said input and output circuits, a source of potential, a potentiometer connected across said source of potential, and connections from said resistor connecting said input and output circuits to said potentiometer whereby a portion of said potential may be applied to said resistor, said cathode being connected to an intermediate point on said resistor to provide the proper proportion between the control grid bias and the anode potential, irrespective of potential applied to said resistor.

HAROLD L. SAXTON.